US011003711B2

(12) United States Patent
Balakrishnan et al.

(10) Patent No.: US 11,003,711 B2
(45) Date of Patent: May 11, 2021

(54) ACCESSING AUDIO FILES FROM AN ONLINE CONTENT MANAGEMENT SYSTEM

(71) Applicant: Dropbox, Inc., San Francisco, CA (US)

(72) Inventors: Ramesh Balakrishnan, San Francisco, CA (US); Josiah Boning, San Francisco, CA (US); Jie Tang, San Francisco, CA (US); Julie Tung, Mountain View, CA (US)

(73) Assignee: Dropbox, Inc., San Francisco, CA (US)

( * ) Notice: Subject to any disclaimer, the term of this patent is extended or adjusted under 35 U.S.C. 154(b) by 708 days.

(21) Appl. No.: 13/797,041

(22) Filed: Mar. 12, 2013

(65) Prior Publication Data

US 2014/0195550 A1 Jul. 10, 2014

Related U.S. Application Data

(60) Provisional application No. 61/749,152, filed on Jan. 4, 2013.

(51) Int. Cl.
*G06F 17/00* (2019.01)
*G06F 16/64* (2019.01)
*G06F 16/9535* (2019.01)

(52) U.S. Cl.
CPC .......... *G06F 16/64* (2019.01); *G06F 16/9535* (2019.01)

(58) Field of Classification Search
CPC .................................. G06F 17/30775
USPC .......................................... 707/754
See application file for complete search history.

(56) References Cited

U.S. PATENT DOCUMENTS

| 8,315,976 | B2 * | 11/2012 | Multer ................. G06F 16/178 707/610 |
| 8,352,638 | B2 | 1/2013 | Pace et al. |
| 9,098,598 | B1 * | 8/2015 | Kobyakov ............ G06F 16/958 |
| 2006/0074888 | A1 * | 4/2006 | Tamura ................. G06F 16/904 |
| 2007/0162400 | A1 * | 7/2007 | Brew .................. G06F 21/6236 705/59 |
| 2007/0276866 | A1 * | 11/2007 | Bodin ................. G06F 16/4387 |
| 2008/0059510 | A1 * | 3/2008 | Cardamore ......... G06F 16/4387 |
| 2008/0098442 | A1 * | 4/2008 | Greenbaum ..................... 725/86 |
| 2008/0163288 | A1 * | 7/2008 | Ghosal ............... H04N 21/8358 725/31 |
| 2008/0172412 | A1 * | 7/2008 | Gruhl ..................... G06Q 10/00 |
| 2008/0189284 | A1 * | 8/2008 | Vanasco .................. G06F 21/10 |
| 2009/0125571 | A1 * | 5/2009 | Kiilerich et al. ............. 707/204 |

(Continued)

OTHER PUBLICATIONS

"Automatica Brings Dropbox and Cloud Storage Files to Your Car".

*Primary Examiner* — Hasanul Mobin
(74) *Attorney, Agent, or Firm* — Polsinelli PC (57) ABSTRACT

The disclosed embodiments relate to a system that facilitates accessing audio files associated with a user from an online content management system. During operation, the online content management system receives a function call from a client to list audio files associated with the user. In response to the function call, the system filters through operations for files associated with the user to identify audio files. Next, the system returns metadata for the identified audio files associated with the user to the client. In some embodiments, filtering through the operations involves filtering an operation log to identify operations performed on audio files associated with the user, wherein the operations occurred since a preceding call to the function.

32 Claims, 3 Drawing Sheets

(56) References Cited

U.S. PATENT DOCUMENTS

| | | |
|---|---|---|
| 2010/0250497 A1 | 9/2010 | Redlich et al. |
| 2011/0112667 A1* | 5/2011 | Lawrence ............... G06F 3/162 700/94 |
| 2011/0208616 A1* | 8/2011 | Gorman ............ G06F 17/30743 705/27.1 |
| 2011/0225417 A1* | 9/2011 | Maharajh et al. ............. 713/150 |
| 2012/0030018 A1* | 2/2012 | Passmore ............ G06F 16/9535 705/14.52 |
| 2012/0117026 A1* | 5/2012 | Cassidy ............ G06F 17/30053 707/634 |
| 2012/0197998 A1* | 8/2012 | Kessel ................... G06Q 10/10 709/205 |
| 2012/0221701 A1* | 8/2012 | Mair ....................... H04L 51/32 709/223 |
| 2014/0013200 A1* | 1/2014 | White ............... H04N 21/4788 715/230 |
| 2014/0041054 A1* | 2/2014 | Yalcinalp ............... H04H 60/15 726/28 |
| 2014/0181014 A1* | 6/2014 | Balakrishnan ........ G06F 16/275 707/611 |
| 2014/0181935 A1* | 6/2014 | Beckmann ............. G06F 16/93 726/7 |

\* cited by examiner

ACCESSING AUDIO FILES FROM AN ONLINE CONTENT MANAGEMENT SYSTEM

RELATED APPLICATION

This application claims priority under 35 U.S.C. § 119 to U.S. Provisional Application No. 61/749,152, entitled "Accessing Media Files From a Cloud-Based Content Management System," by Ramesh Balakrishnan, Josiah Boning, Jie Tang and Julie Tung, filed 4 Jan. 2013, the contents of which are herein incorporated by reference in their entirety.

BACKGROUND

Field

The disclosed embodiments generally relate to online content management systems. More specifically, the disclosed embodiments relate to a system that facilitates accessing audio files from an online content management system.

Related Art

Online content management systems, such as the Dropbox™ service provided by Dropbox, Inc. of San Francisco, Calif., presently provide a convenient way for a user to store content items (such as audio files) in a replicated, synchronized storage architecture that allows the user to share content items with other users, and also enables the user to access content items from different computing devices. As these online content management systems become more prevalent, people are beginning to use them to store different types of content, such as audio files. Storing audio files in an online content management system enables users to access their audio files from different network-connected electronic devices, such as a laptop computer or audio player in a car.

However, existing online content management systems do not provide convenient mechanisms for accessing audio files. At the moment, audio files are typically stored in various folders belonging to the user on the online content management system, and the user needs to manually navigate through these folders to locate audio files for playback on a client device.

Hence, what is needed is a more convenient way for users to access their audio files on an online content management system.

SUMMARY

The disclosed embodiments relate to a system that facilitates accessing audio files associated with a user from an online content management system. During operation, the online content management system receives a function call from a client to list audio files associated with the user. In response to the function call, the system filters through operations for content items associated with the user to identify audio files. Next, the system returns metadata for the identified audio files associated with the user to the client. In some embodiments, filtering the operations involves filtering an operation log to identify operations performed on audio files associated with the user, wherein the operations occurred since a preceding call to the function.

DETAILED DESCRIPTION

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

The disclosed embodiments relate to a system that facilitates accessing audio files associated with a user from an online content management system. Before describing details of this system, we first describe the basic structure of the online content management system.

Content Management Environment

Figure 1:
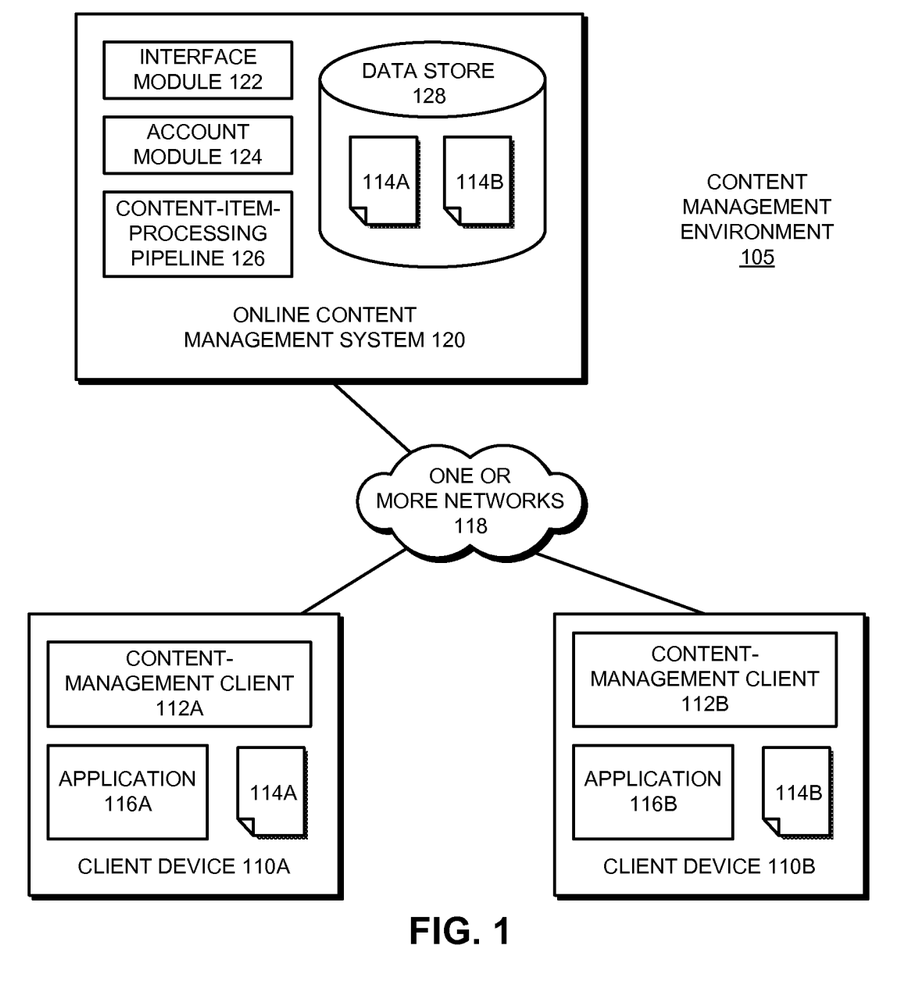
FIG. 1 illustrates a content management environment in accordance with the disclosed embodiments.

FIG. 1 illustrates content management environment 105 according to various embodiments. As may be understood from this figure, content management environment 105 includes a plurality of client devices 110A-110B (collectively 110) and an online content management system 120 (also referred to as a "content management system") which are interconnected by one or more networks 118. Various aspects of the client devices 110 and online content management system 120 are discussed below.

Client Devices

In various embodiments, each client device 110 may selectively execute a content-management client application 112A-112B (collectively 112) (also referred to as a "content-management client"), which may be used to access content items stored within content management system 120. In some embodiments, copies of content items 114A and 114B are maintained on client devices 110A and 110B, respectively, and synchronized copies of content items 114A and 114B are maintained on content management system 120. (Note that a content item can include a file, a folder or some other type of data item or collection of data items.) In some embodiments, client devices 110 may provide a file-browser type interface (not shown) for directly manipulating the content items stored on online content management system 120 without maintaining a local copy. Client devices 110 may also include applications 116A and 116B (collectively 116) for manipulating content items, such as content items 114A and 114B.

While only two client devices 110A and 110B are shown in FIG. 1 for purposes of clarity, it should be understood by those skilled in the art that many client devices 110 may simultaneously connect through network(s) 118 to content management system 120 at any given time. Examples of suitable client devices 110 include, but are not limited to, a desktop computer; mobile computing devices, such as a laptop or a tablet; and handheld devices, such as a smartphone (e.g., an IPHONE®, BLACKBERRY®, or ANDROID™-based smartphone). Each client device 110 may store a local, synced copy of one or more content items from within content management system 120, and the content items may be stored in any suitable file format. When content-management client 112 presents content items that are stored within the file storage system to a user, the content items may be arranged in folders and the folders themselves may be arranged in other folders, or in any other arbitrary arrangement supported by content management system 120, as determined by the user. However, one of skill in the art should understand in light of this disclosure that each user's file storage architecture may be considerably different from the next, and in some instances, the file storage architecture may be implemented to maximize storage and content item retrieval efficiency.

Content Management System

Content management system 120 stores content items and manages access to those content items via client devices 110. Content management system 120 and its components may be implemented using any appropriate hardware and software for file serving, storage, and retrieval functions. For example, content management system 120 may be implemented in the form of a single server or multiple servers.

In various embodiments, content management system 120 includes interface module 122, data store 128, account module 124 and file-processing pipeline 126. Some of these elements of content management system 120 are discussed in more detail below.

Content Management System—Interface Module

In particular embodiments, interface module 122 may facilitate content item access and content item storage operations among content management system 120 and client devices 110. Interface module 122 may receive content items from and send content items to client devices 110 consistent with the user's preferences for sharing content items. Interface module 122 may act as the counterpart to a client-side file-explorer style user interface that allows a user to manipulate content items directly stored on content management system 120. In some embodiments, software operating on client devices 110 may integrate network-stored content items with the client's local file system to enable a user to manipulate network-stored content items through the same user interface (UI) used to manipulate content items on the local file system, e.g., via a file explorer, file finder or browser application. As an alternative or supplement to the client-side file-explorer interface, interface module 122 may provide a web interface for client devices 110 to access (e.g., via a suitable application 116) and allow a user to manipulate content items stored within content management system 120. In this way, the user can directly manipulate content items stored within content management system 120.

Content Management System—Data Store

In various embodiments, data store 128 may store content items such as those uploaded using client devices 110, or using any other suitable computing device. In the embodiment illustrated in FIG. 1, client device 110A, which is associated with a first user, is shown as locally storing at least one content item 114A, and client device 110B, which is associated with a second user, is shown as locally storing at least one content item 114B. As shown in FIG. 1, a copy of the locally stored content item 114A and a copy of locally stored content item 114B are maintained in data store 128 in content management system 120. In the embodiment illustrated in FIG. 1, content items 114A and 114B are synchronized content items which reside on client devices 110A-110B and online content management system 120. Note that client devices 110A-110B may also store other content items which are replicated on online content management system 120, and which are shared with other client devices.

In various embodiments, data store 128 may maintain information identifying the user, information describing the user's file directory, and other information in a file journal (also referred to as a "log") that is maintained for each user. In some embodiments, the file journal may be maintained on content management system 120, and in other embodiments, a file journal (e.g., a "server-side file journal") may be maintained both on content management system 120 and locally on each client device 110. In various embodiments, the file journal may be used to facilitate the synchronization of the various copies of a particular content item that are associated with a user's account.

As a particular example, in the embodiment shown in FIG. 1, the system may be configured so that any changes made to content item 114A on particular client device 110A may also be automatically reflected in the copy of content item 114A stored within online content management system 120. Similarly, any changes made to the copy of content item 114A on online content management system 120 may also be automatically reflected in the copy of content item 114A stored on client device 110A.

Content Management System—Account Module

In particular embodiments, account module 124 may track content items stored in data store 128 and entries in the server-side file journal for each content item. As users grant content item access permissions to other users, account module 124 may update the server-side file journal associated with each relevant user in data store 128. Account module 124 may also track client devices 110 that are associated with each user's account. For example, a user may want to share all their content items among their desktop computer, tablet computer, and mobile device. To make such a sharing arrangement seamless to the user, the user's single account on content management system 120 may be associated with each of the user's respective client devices. In some embodiments, an application running on each respective client device 110 may help to coordinate synchronization of content items on the client device with corresponding versions of the content items within the user's account in content management system 120, and also with corresponding versions of the content items stored on the user's various other client devices.

Content Management System—Content-Item-Processing Pipeline

In particular embodiments, content-item-processing pipeline 126 is configured to process incoming content items which are to be stored in online content management system 120. In doing so, content-item-processing pipeline 126 extracts metadata for the incoming content items, including metadata for audio files as is described below with reference to FIGS. 2 and 3.

System for Processing Audio Files

Figure 2:
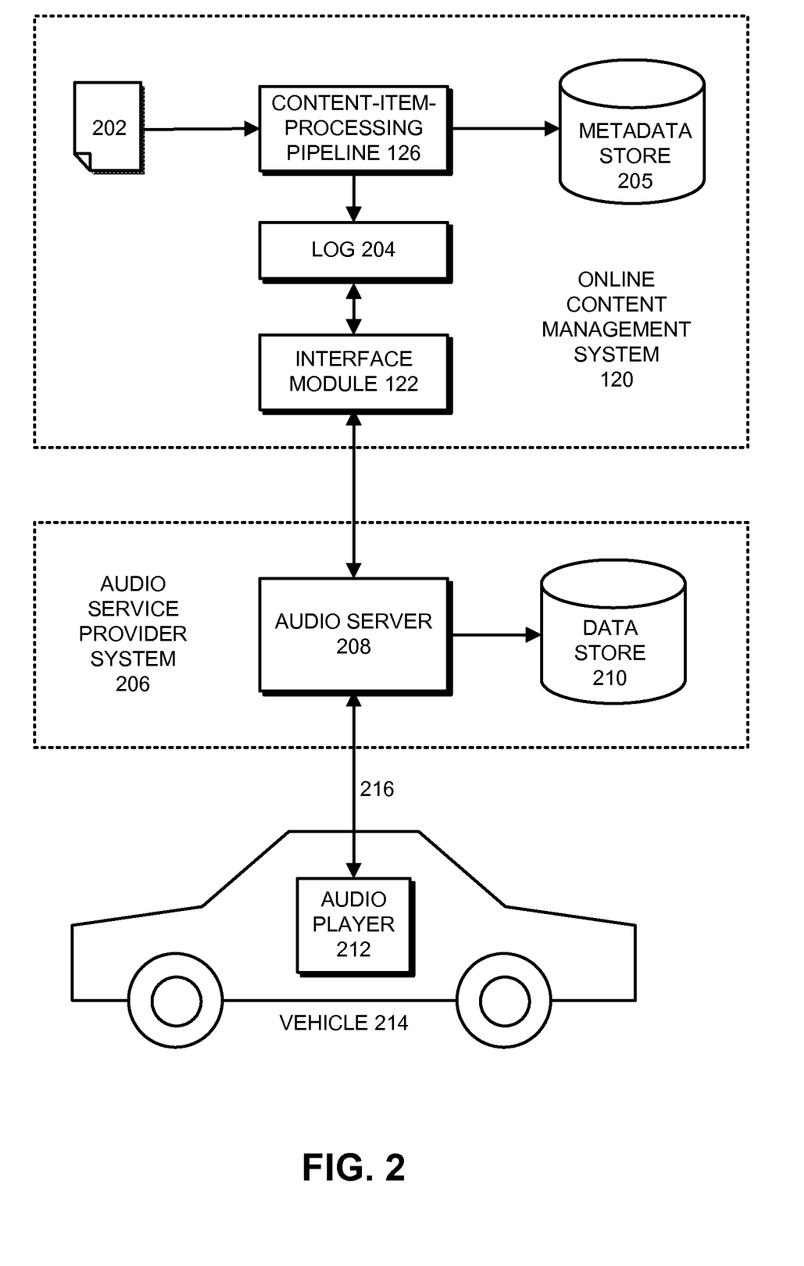
FIG. 2 illustrates a system for processing audio files in accordance with the disclosed embodiments.

FIG. 2 illustrates a system for processing audio files in accordance with the disclosed embodiments. As illustrated at the top of FIG. 2, a number of modules within online content management system 120 are involved in processing these audio files. For example, suppose a user adds an audio file 202 to online content management system 120 by moving audio file 202 to a special folder on a client device, wherein the special folder serves as an interface to online content management system 120. As illustrated in FIG. 2, when audio file 202 arrives at online content management system 120, audio file 202 feeds through a content-item-processing pipeline 126. Content-item-processing pipeline 126 includes a set of extractors to process arbitrary file formats, and one of these extractors is an audio-specific extractor which is designed to extract metadata associated with audio files. This audio-specific extractor determines whether the content item is an audio file and also extracts metadata for the content item.

For example, if the content item is an audio music file, content-item-processing pipeline 126 can possibly extract the following types of metadata: a title of a song contained in the music file; a name of an artist associated with the song; a name of an album associated with the song; a duration of the song; a year the song was recorded; a music genre for the song; a file format for the music file; a length of the song; a file handle that can be used to retrieve the music file from the online content management system; a number of times the user has played the song; cover art associated with the song; a list of users who have accessed the song; a publication date for the song; and a name of a copyright holder for the song.

This metadata is stored in a general-purpose derived metadata store 205 maintained within online content management system 120. Metadata store 205 comprises a database that is indexed by namespace, a hash of the audio file's contents and the type of metadata (e.g., audio metadata). Metadata store 205 can also be organized in other ways. For example, metadata store 205 can separately store metadata for content items associated with each user, or alternatively, metadata store can collectively store metadata for content items for a group of users (in which case a user identifier is stored with each content item). In an alternative embodiment, the metadata for each content item is stored in the same storage space as the content item, in which case the metadata for a given content item is accessed by following a pointer to the given content item and then accessing the metadata from a storage space adjacent to the content item. Also, a record of operations being performed on the audio file (e.g., insertion, deletion or change) is stored in log 204.

Next, information from metadata store 205 and log 204 is communicated through interface module 122 to audio server 208. Note that audio server 208 can obtain information about audio files associated with a user through an audio API function. Each time the audio API function is called, it returns a list of audio files added, deleted, or changed since the last call. To obtain this list, this function fetches information from log 204 regarding operations which occurred since the last call to the function, and then filters the information to return only changes to audio files. Audio server 208 uses these changes to update a list of audio files associated with the user. This list is maintained locally in data store 210. Audio server 208 can also use file handles stored in this list of audio files to retrieve the actual audio files from online content management system 120 to be stored locally in data store 210.

Note that the local data store 210 may not have enough storage capacity to accommodate all of the music files that belong to a user, in which case it may be necessary to cache commonly used music files in local data store 210. For example, local data store 210 can be configured to implement a cache for the most-recently used music files that belong to a user. Other less-recently used music files will not be stored in local data store 210 and will instead have to be stored in online content management system 120.

Finally, an audio player 212, which for example can comprise an audio system in a vehicle 214 operated by the user, can access audio files belonging to the user from audio server 208. During this process, audio server 208 works together with audio player 212 to perform various transcoding and caching operations to allow audio player 212 to play an audio file through an intermittent cellular data connection 216 between audio server 208 and audio player 212.

In the case where the audio file is a music file, the API can include an additional function that returns "cover art" for a specified music file. Recall that this cover art can be stored along with the metadata for a music file. Alternatively, the metadata for a music file can contain a pointer to the cover art.

As mentioned above, an audio file 202 can be explicitly added to online content management system 120 by the user. However, audio files can also be added to content management system 120 in other ways. For example, if a user of audio player 212 in vehicle 214 is browsing through different radio stations and likes a particular song, the user can ask audio player 212 to upload the song to online content management system 120. Audio player 212 can then ask online content management system 120 to upload the song, and online content management system can then proceed to purchase and upload the song from a music web site. After the song is uploaded, online content management system 120 can process the song as described above through content-item processing pipeline 126.

Process for Listing a User's Audio Files

Figure 3:
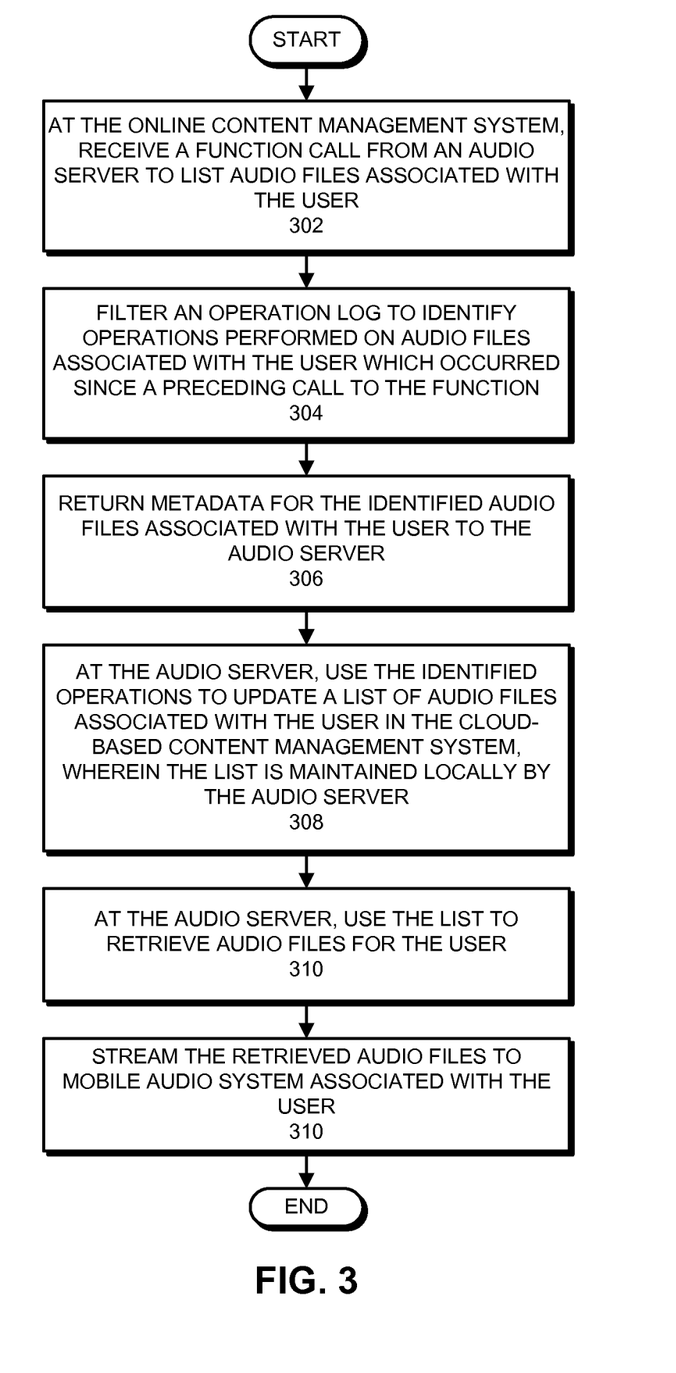
FIG. 3 presents a flow chart illustrating the process of listing a user's audio files from an online content management system in accordance with the disclosed embodiments.

FIG. 3 presents a flow chart illustrating the process of listing a user's audio files stored in online content management system 120 in accordance with the disclosed embodiments. First, online content management system 120 receives a function call from audio server 208 to list audio files associated with a user (step 302). This call from audio server 208 can be triggered, for example, if a user of audio player 212 requests to play music files from the user's account within online content management system 120. In response to this request, audio player 212 can send a request to audio server 208 to obtain a listing of the music files which belong to the user, which causes audio server 208 to make a call to list the music files to online content management system 120.

In response to the call, online content management system 120 filters log 204 to identify operations performed on audio files associated with the user which occurred since a preceding call to the function (step 304). If this is the first time that the function is called for a user, the system filters log 204 starting at the beginning of the user's history within online content management system 120. Next, metadata for the identified audio files and information about the associated operations are returned to audio server 208 (step 306). In some embodiments, this metadata is obtained from general-purpose derived metadata store 205. In some embodiments, each audio file is stored as a JavaScript Object Notation (JSON) object, and the audio file's metadata is stored in JSON fields in the JSON object and the above-described function call returns a list of JSON objects.

As mentioned above, audio server 208 uses the identified operations to update a list of audio files associated with the user, wherein the list is maintained locally in audio service provider system 206 in data store 210 (step 308). In an alternative embodiment, online content management system 120 automatically propagates updates to audio files from online content management system 120 to audio service provider system 206 whenever a content item is added to or modified within online content management system 120. In this case, there is no need for audio server 208 to maintain a list of content items for a specific user because audio server 208 will already have an up-to-date list of content items for each user. In another embodiment, instead of merely sending updates, the entire list of audio files associated with the user is sent from online content management system 120 to audio server 208 in response to the function call. This eliminates the need for audio server 208 to locally store such a list, but it requires more information to be communicated between online content management system 120 and audio server 208 during execution of the function call.

Then, as mentioned above, audio server 208 can use file handles stored in the list of audio files to retrieve the audio files for the user from online content management system 120 to be stored locally in audio service provider system 206 in data store 210 (step 310). Finally, audio server 208 streams the audio files to a mobile audio player 212 associated with the user (step 312). For example, audio player 212 can comprise an audio system in a vehicle such as a car. In an alternative embodiment, the audio files are streamed directly from online content management system 120 to mobile audio player 212. In this case, online content management system 120 can perform transcoding operations to handle variability in the transmission bandwidth between online content management system 120 and mobile audio player 212. In another embodiment, audio files are streamed from a third-party music service to mobile audio player 212. This presumes the user of mobile audio player 212 has an account with the third-party music service.

In yet another embodiment, audio files can be streamed from storage in other devices belonging to the user to mobile audio player 212. For example, if the user has a laptop in vehicle 214 and the laptop contains audio files that the user desires to play, the audio files can be streamed directly (for example through WiFi) from the laptop to mobile audio player 212. In this embodiment, online content management system 120 keeps track of where the user stores copies of each audio file to facilitate this type of streaming.

Sharing Audio Files

In some cases, the audio files which are accessed by the system can include "shared audio files," which are shared between two or more users. In some embodiments, these shared audio files are retrieved from a "shared folder" in online content management system 120, wherein the shared folder can be accessed by multiple users of online content management system 120. For example, the shared folder may include songs which are shared between two or more users. Note that this shared folder can provide read/write access to some users and read-only access to other users.

In other embodiments, audio server 208 can pull audio files from folders that belong to different users. For example, if two users are taking a long trip together in the same car, the car audio system can retrieve songs from different folders belonging to the two users in online content management system 120.

In other embodiments, online content management system 120 maintains one or more "playlists" for each user, wherein each playlist contains a different group of songs which are assembled by each user. These playlists could potentially be shared between multiple users. For example, multiple users may be able to edit a shared playlist. Also, a first user may be able to edit a copy of a playlist that belongs to a second user, while the original playlist which belongs to the second user remains unmodified. The system can also compare playlists belonging to two users to determine which types of songs both users like and can present a list of such songs for playback through mobile audio player 212.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for facilitating access to audio files associated with a user from an online content management system, comprising:
 receiving, at the online content management system, a call from a client application on a client device associated with the online content management system to list content items that are audio files stored in a user account at the online content management system and wherein the user account is associated with the client application on the client device and the online content management system synchronizes changes to the content items between the client application and the online content management system; and
 in response to the call,
  filtering through operations on the content items associated with the user account to identify audio files, wherein the operations and associated metadata for the content items are stored in the online content management system,
  returning metadata for the identified audio files associated with the user to the client application,
  using the returned metadata to update a list of audio files stored in the client application, and
  using a file handle stored in the list of audio files to automatically retrieve the audio files from the online content management system.

2. The method of claim 1, wherein the call is received through a function in an application-programming interface (API) which the client application calls to access the online content management system, and wherein the client application accesses audio files associated with a third-party application and the audio files associated with the third-party application are included in the list of audio files stored in the client application, and wherein the third-party application and the client application are different.

3. The method of claim 2, wherein filtering through the operations involves filtering an operation log to identify operations performed on audio files associated with the user, wherein the filtering involves identifying operations which occurred since a preceding call to the function.

4. The method of claim 3, wherein whenever the user performs an operation on a content item in the online content management system, the method comprises saving the operation and associated metadata to the operation log.

5. The method of claim 3, wherein an operation on a content item can include one of:
an insertion of the content item into the online content management system;
a deletion of the content item from the online content management system; and
a change to the content item in the online content management system.

6. The method of claim 3, further comprising:
receiving the metadata for the identified audio files associated with the user at the client application; and
applying the operations to a data store maintained at the client application, wherein the data store maintains a record of audio files associated with the user in the online content management system.

7. The method of claim 1, wherein metadata for a given audio file provides the file handle that is used to retrieve the given audio file from the online content management system.

8. The method of claim 1, wherein the audio files are music files, and wherein the metadata for a given music file includes one or more of:
a title of a song contained in the given music file;
a name of an artist associated with the song;
a name of an album associated with the song;
a duration of the song;
a year the song was recorded;
a music genre for the song;
a file format for the given music file; and
a file handle that can be used to retrieve the given music file from the online content management system.

9. The method of claim 1, wherein the client application is part of a system that enables the user to access audio files from the online content management system for playback on a mobile device.

10. The method of claim 9, wherein the mobile device is a car audio system.

11. The method of claim 1, wherein the content items associated with the user are content items in a shared folder in the online content management system;
wherein the shared folder is shared between the user and one or more other users; and
wherein the call returns metadata for audio files in the shared folder.

12. The method of claim 1,
wherein the content items associated with the user include content items associated with multiple users; and
wherein the call returns metadata for audio files associated with the multiple users.

13. A non-transitory computer-readable storage medium storing instructions that when executed by a computer cause the computer to perform a method for facilitating access to audio files associated with a user from an online content management system, the method comprising:
receiving, at the online content management system, a call from a client application on a client device associated with the online content management system to list content items that are audio files stored in a user account at the online content management system and wherein the user account is associated with the client application on the client device allowing the online content management system to synchronize the content items between the client application and the online content management system; and
in response to the call,
filtering through operations on the content items associated with the user account to identify audio files, wherein the operations and associated metadata are stored in the online content management system,
returning the metadata for the identified audio files associated with the user to the client application,
using the returned metadata to update a list of audio files stored in the client application, and
using a file handle stored in the list of audio files to automatically retrieve the audio files from the online content management system.

14. The non-transitory computer-readable storage medium of claim 13, wherein the call is received through a function in an application-programming interface (API) which the client application is configured to call to access the online content management system, and wherein the client application is configured to access audio files associated with a third-party application and the audio files associated with the third-party application are included in the list of audio files stored in the client application, and wherein the third-party application and the client application are different.

15. The non-transitory computer-readable storage medium of claim 14, wherein filtering through the operations involves filtering an operation log to identify operations performed on audio files associated with the user, wherein the filtering involves identifying operations which occurred since a preceding call to the function.

16. The non-transitory computer-readable storage medium of claim 15, wherein whenever the user account performs an operation on a content item in the online content management system, the method comprises saving the operation and associated metadata to the operation log.

17. The non-transitory computer-readable storage medium of claim 15, wherein an operation on a content item is configured to include one of:
an insertion of the content item into the online content management system;
a deletion of the content item from the online content management system; and
a change to the content item in the online content management system.

18. The non-transitory computer-readable storage medium of claim 15, further comprising:
receiving the metadata for the identified audio files associated with the user at the client application; and
applying the operations to a data store maintained at the client application, wherein the data store maintains a record of audio files associated with the user in the online content management system.

19. The non-transitory computer-readable storage medium of claim 13, wherein metadata for a given audio file provides the file handle that can be used to retrieve the given audio file from the online content management system.

20. The non-transitory computer-readable storage medium of claim 13, wherein the audio files are music files, and wherein the metadata for a given music file includes one or more of:
a title of a song contained in the given music file;
a name of an artist associated with the song;
a name of an album associated with the song;
a duration of the song;
a year the song was recorded;

a music genre for the song;
a file format for the given music file; and
a file handle that can be used to retrieve the given music file from the online content management system.

21. The non-transitory computer-readable storage medium of claim 13, wherein the client application is part of a system that enables the user account to access audio files from the online content management system for playback on a mobile device.

22. The non-transitory computer-readable storage medium of claim 21, wherein the mobile device is a car audio system.

23. The non-transitory computer-readable storage medium of claim 13,
wherein the content items associated with the user account are content items in a shared folder in the online content management system;
wherein the shared folder is shared between the user account and one or more other users; and
wherein the call returns metadata for audio files in the shared folder.

24. The non-transitory computer-readable storage medium of claim 13,
wherein the content items associated with the user account include content items associated with multiple users; and
wherein the call returns metadata for audio files associated with the multiple users.

25. A system that facilitates access to audio files associated with a user from an online content management system, comprising:
an online content management system storing content items, hosted on at least one server;
wherein the online content management system is configured to,
receive a call from a client application on a client device associated with the online content management system to list content items that are audio files stored in a user account at the online content management system and wherein the user account is associated with the client application on the client device allowing the online content management system to synchronize the content items between the client application and the online content management system; and
in response to the call,
filter through operations on content items associated with the user to identify audio files, wherein the operations and associated metadata are stored in the online content management system,
return the metadata for the identified audio files associated with the user to the client,
use the returned metadata to update a list of audio files stored in the client, and
use a file handle stored in the list of audio files to automatically retrieve the audio files from the online content management system.

26. The system of claim 25, wherein the call is received through a function in an application-programming interface (API) which the client application is configured to call to access the online content management system, and wherein the client application is configured to access audio files associated with a third-party application and the audio files associated with the third-party application are included in the list of audio files stored in the client, and wherein the third-party application and the client application are different.

27. The system of claim 25, wherein filtering the through the operations involves filtering an operation log to identify operations performed on audio files associated with the user, wherein the filtering involves identifying operations which occurred since a preceding call to the function.

28. The system of claim 25, wherein the audio files are music files, and wherein the metadata for a given music file includes one or more of:
a title of a song contained in the music file;
a name of an artist associated with the song;
a name of an album associated with the song;
a duration of the song;
a year the song was recorded;
a music genre for the song;
a file format for the music file; and
a file handle that can be used to retrieve the music file from the online content management system.

29. A method for facilitating access to audio files associated with a user from an online content management system, comprising:
at a client application on a client device associated with the online content management system, making a call from the client application associated with a user account through a function in an application-programming interface (API) to the online content management system storing content items in the user account, wherein in response to the call the online content management system filters an operation log to identify operations performed on audio files associated with the user account, wherein the online content management system synchronizes content items between the client application and the online content management system based on the association with the user account and wherein the filtering involves identifying operations which occurred since a preceding call to the function;
in response to the call, receiving the identified operations and associated metadata at the client application; and
using the identified operations and the metadata to update a list of audio files stored in the client application, and using a file handle stored in the list of audio files to automatically retrieve the audio files from the online content management system, wherein the said updating involves applying the identified operations to a data store maintained at the client application, wherein the data store maintains a record of audio files associated with the user in the online content management system.

30. The method of claim 29, wherein the audio files are music files, and wherein the metadata for a given music file includes one or more of:
a title of a song contained in the music file;
a name of an artist associated with the song;
a music genre for the song;
a file format for the music file; and
a file handle that can be used to retrieve the music file from the online content management system.

31. The method of claim 29, wherein the client application is part of a system that enables the user to access audio files from the online content management system for playback on a mobile device; and wherein the client application is configured to access audio files associated with a third-party application and the audio files associated with the third-party application are included in the list of audio files stored in the client, and wherein the third-party application and the client application are different.

32. The method of claim 31, wherein the mobile device is a car audio system.

\* \* \* \* \*